March 1, 1960     H. FISCHER     2,926,737
TRANSMISSION COOLING SYSTEM
Filed Aug. 22, 1956
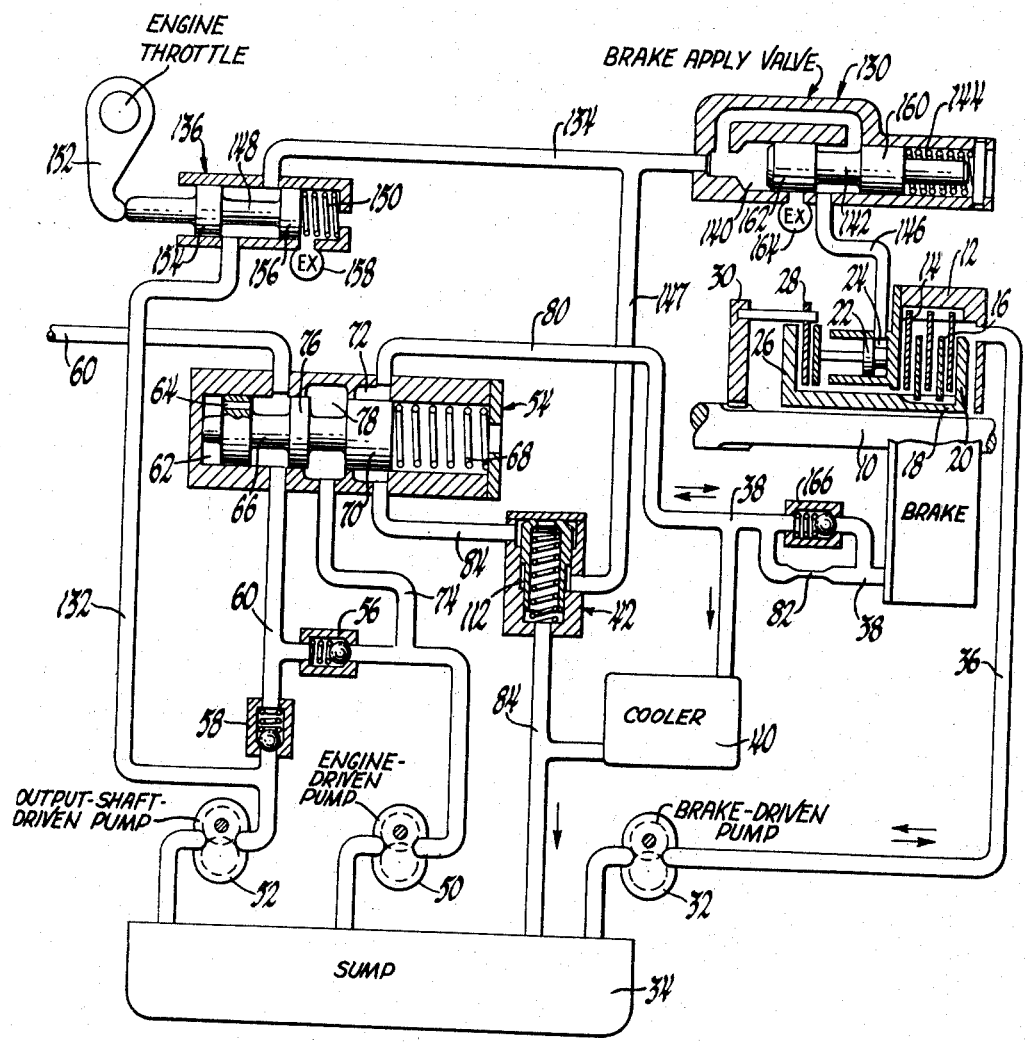
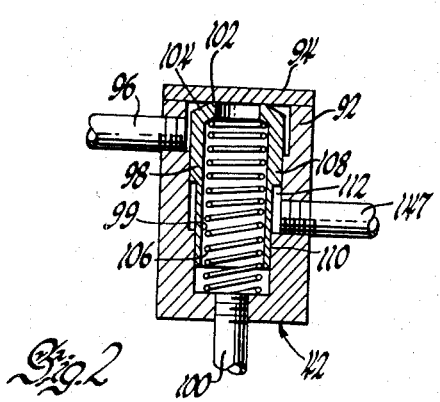
INVENTOR.
Harold Fischer
BY
T. L. Chisholm
ATTORNEY

United States Patent Office 2,926,737
Patented Mar. 1, 1960

2,926,737

TRANSMISSION COOLING SYSTEM

Harold Fischer, Flint, Mich., assignor to General Motors Corporation, Detroit, Mich., a corporation of Delaware Application August 22, 1956, Serial No. 605,641

7 Claims. (Cl. 180—54)

This invention relates to transmissions of the type having an intermittently operated device which requires cooling, such as a transmission shaft brake and to arrangements for cooling such devices.

The objects of the invention include in general an improved arrangement for cooling a heat generating device operated intermittently on a transmission as will be more fully developed in the following description.

In the drawings, Fig. 1 is a diagrammatic representation of a portion of a transmission embodying one form of the invention, and Fig. 2 is a section of the structure of a control valve used in the transmission.

The invention may be applied to a transmission of the type disclosed in the application for U.S. patent filed by Oliver K. Kelley on July 17, 1956, S.N. 598,370, the disclosure of which is incorporated herein by reference.

Referring to the drawings, a transmission output shaft 10 may be driven by any suitable transmission driven by an engine for driving any suitable load such as the propeller shaft of an automobile as more fully disclosed in the Kelley application referred to. A vehicle brake includes a casing 12 surrounding the output shaft and containing stationary brake plates 14 interleaved between driven brake plates 16 which latter are splined to a hollow shaft 18 journalled and slidable on the output shaft. The hollow shaft is formed with a collar 20 by which all of the brake plates may be clamped together when the hollow shaft is moved to the left as the drawing is seen, for example by a piston 22 actuated by fluid pressure in a cylinder 24 and bearing against a second collar 26 on the left end of the hollow shaft. Between piston 22 and collar 26 is a clutch plate 28 splined to a disk 30 keyed to the shaft 10 so that when fluid under pressure is admitted to the cylinder 24, the piston presses the clutch plate 28 against collar 26 to rotate the hollow shaft 18 with the output shaft 10. Any suitable thrust bearing is provided between the piston and the clutch mechanism to permit rotation of the clutch with respect to the piston, as disclosed in the Kelley application. At the same time the piston slides the hollow shaft 18 and entire structure supported by it to the left as the drawing is seen, to engage the brake plates 14 and 16 to retard rotation of the output shaft.

The casing 12 forms a brake cooling chamber through which oil is circulated, whenever the brake is applied, by a pump 32 drawing oil from a sump 34 and delivering it by conduit 36 near the top of chamber 12, from which the oil flows by conduit 38 back to sump 34, either through a cooler 40, or around the cooler when permitted by a by-pass valve 42, as will be explained.

The pump is keyed to the hollow shaft 18, as is more fully disclosed in the Kelley application, so that it circulates oil whenever the brake is applied.

The brake may be included in a transmission driven by [illegible] and having an engine driven pump or front 52 c[illegible] an output shaft driven pump or rear pump [illegible] the shaft 10, either or both of which pumps draw oil from the sump 34 and circulate it through the transmission in known manner. The pumps supply oil through a pressure regulator valve 54 through check valves 56 and 58, respectively, both of which discharge to a main line 60 which supplies oil at a regulated pressure to the transmission for controlling and lubricating it, the oil returning to the sump as is known. Either pump together with conduit 60 and any conduits connected thereto represents means for supplying oil to the transmission, circulating it through the transmission and returning it to the sump. The pressure of the main line is determined by a pressure regulating chamber 62 connected to the main line through a passage 64 and urging a valve stem 66 to the right against the force of a spring 68. Whenever the car drives the rear pump 52 fast enough to supply the control system, the pressure in the regulating chamber 62 reaches a value at which a land 70 on the valve stem is moved to the right to open an exhaust port 72 to discharge oil from the delivery line 74 of the engine driven pump to the sump 34 through the cooler 40. This reduces the pressure provided by the engine driven pump and reduces the power required to operate the system. Thereafter the rear pump 52 supplies oil at the regulated pressure to the main line 60. If the pressure tends to rise above this value this pressure in the regulating chamber 62 moves the stem 66 further to the right until a land 76 connects the main line 60 with the chamber 78 which has previously been opened by the land 70 to the discharge port 72 as explained above. Therefore, during normal operation oil from both the front pump 50 and the rear pump 52 will be continuously discharged into the outlet port 72. From this port the oil flows through three possible paths, including a conduit 80 delivering to two paths, one of which includes the cooler 40 from which the oil returns to the sump 34 and the other of which includes a restriction 82 or slow flow passage in conduit 38 leading into the bottom of the brake casing 12 by conduit 38. Oil flowing slowly through the conduit 38 eventually fills the brake casing and overflows through the conduit 36 through the idle pump 32 and back to the sump 34. The purpose of this arrangement is to keep the brake plates 14—16 immersed in oil so that they will be lubricated instantly whenever they are engaged and to keep the pump 32 primed so that it will deliver oil to the brake casing as soon as the brake is engaged by the chamber 24. The third path is a by-pass 84 between the outlet port 72 and the sump 34 which can deliver oil to the sump without flowing through the cooler or brake casing. Flow through the by-pass is controlled by the cooler by-pass valve 42 which is normally closed but opens at a predetermined pressure in the cooler. This provides for by-passing the cooler if there is excessive flow into the outlet port 72 or if the cooler clogs.

The valve 42 preferably includes a casing 92 having a valve seat 94, an inlet connection 96 adjacent the valve seat, a tubular valve 98 having a central bore 99 and an outlet 100 in line with the center of the bore 99. The valve has a flat surface 102 adapted to close against the valve seat 94 to prevent communication between the inlet 96 and outlet 100 and a surface 104 exposed to the pressure of the inlet to urge the valve open against a helical closing spring 106. The spring is preferably disposed inside the tube and the portion of the bore 99 which is disposed within the spring constitutes the passage through the valve. One of the objects of the invention is to provide an unobstructed passage inside of the spring so that oil does not have to pass between the convolutions of the spring. When the valve is open or held off its seat the convolutions are pressed closer together and so would otherwise tend to restrict flow. Whenever this valve is open there is an unobstructed passage from the inlet 96 to the outlet 100 and the effective cross-section of this passage is not changed by changes in the spring. This valve diverts all oil through the cooler which flows either from the brake chamber 12 or from the overflow of the regulator valve 54, unless the pressure in the cooler exceeds a predetermined value, when the valve opens to by-pass the cooler.

It is an object of the invention to flow the maximum amount of oil from the brake-driven pump 32 through the cooler when the brake is applied, and it is specifically an object to increase the pressure at which the by-pass valve 42 opens, as by providing a pressure chamber to urge the valve closed whenever the brake is applied. To this end the outside of valve 98 has portions of two diameters which fit in portions of two diameters in the bore of the casing 92. The large part 108 of the valve is spaced from the small part 110 of the casing to form a pressure chamber 112 to which fluid under pressure is admitted to assist the spring 106 whenever the brake is applied.

The brake is preferably applied manually by closing the throttle of the engine at any time when the car is moving forward above a predetermined speed, such as 10 miles per hour. The source of fluid pressure for applying the brake is the rear pump 52 which supplies sufficient pressure to operate the brake only when the car is running forward and above the predetermined speed. The brake may be applied by a brake apply valve 130 which can be supplied with oil from the rear pump free of influence of the front pump by conduits 132 and 134 provided the engine throttle is closed and places a closed-throttle relay valve 136 in the position shown in the drawing. This connects the rear pump 52 to the space 140 in the brake apply valve 130 where the pressure acting on valve stem 142 urges this stem to the right against a restoring spring 144, as shown in the drawing, to connect conduit 134 to conduit 146 which supplies brake apply chamber 24 to apply the brake. Whenever conduit 134 is supplied oil is conducted by conduit 147 to the chamber 112 of the by-pass valve 42 to increase the pressure required to open this valve. The throttle relay valve 136 includes a valve stem 148 held by a spring 150 in the position shown whenever the throttle is closed. Whenever the throttle is opened, even slightly, an arm 152 connected to the throttle moves the stem 148 to the right so that land 154 blocks conduit 132 and land 156 connects conduit 134 to vent port 158. This drains chamber 112 of the by-pass valve 42 or prevents it being filled, as the case may be, and drains the chamber 140 of the brake apply valve or prevents it being filled. Then the restoring spring 144 pushes the valve stem 142 to the left so that land 160 blocks conduit 134 and land 162 vents the brake apply chamber 24 by connecting conduit 146 to exhaust port 164. This releases the brake or prevents it being applied. The land 160 may be larger than the land 162 to provide different brake apply and release pressures, as is known.

During normal operation of the car with the throttle open the brake is disconnected and oil is being supplied slowly to the brake chamber 12 through the restriction 82 from the pressure regulator valve 54. Whenever the throttle is closed and the car is traveling above the predetermined speed the brake apply valve 130 delivers fluid under pressure to the cylinder 24 to apply the brake and start the pump 32. The pump discharges oil through the conduit 36 to the brake casing 12 and out through the conduit 38 to the cooler and to the conduit 80 leading to the exhaust port 72. The restriction 82 is by-passed by a check valve 166 to permit rapid flow through the casing 12 when the brake is applied and the cooling pump 32 is operating.

I claim:

1. The combination of a transmission driving a shaft for driving a vehicle, means for circulating lubricant from a source of supply through the transmission, a cooler having its inlet connected to the circulating means and its outlet connected to the source of supply, a by-pass conduit from the circulating means around the cooler to the source of supply, a normally closed valve in the by-pass conduit, said valve including means responsive to a predetermined pressure in the cooler for opening the valve, a brake for the shaft, means for applying the brake, means responsive to application of the brake for circulating lubricant in thermal contact with the brake and thence to the inlet of the cooler and to the by-pass conduit, and additional means responsive to operation of the brake urging the valve closed and thereby increasing the pressure of the cooler required to open the valve.

2. The combination of a transmission driving a shaft for driving a vehicle, means for circulating lubricant from a source of supply through the transmission, a cooler having its inlet connected to the circulating means and its outlet connnected to the source of supply, a by-pass conduit from the circulating means around the cooler to the source of supply, a normally closed pressure-responsive valve in the by-pass conduit, said valve including means responsive to a predetermined pressure in the cooler for opening the valve, a brake for the shaft, means for applying the brake, means responsive to application of the brake for circulating lubricant from the circulating means in thermal contact with the brake and means responsive to operation of the brake applying means for resisting opening of the valve and thereby increasing the pressure of the cooler required to open the valve.

3. The combination of a transmission driving a shaft for driving a vehicle, means for circulating lubricant from a source of supply through the transmission, a cooler having its inlet connected to the circulating means and its outlet connected to the source of supply, a by-pass conduit from the circulating means around the cooler to the source of supply, a normally closed pressure-responsive valve in the by-pass conduit, said valve including means responsive to a predetermined pressure in the cooler for opening the valve, a brake for the shaft, fluid pressure operated means for applying the brake, means responsive to application of the brake for circulating lubricant in thermal contact with the brake, and a second fluid pressure operated means for urging the valve closed and connected to the first fluid pressure operated means.

4. The combination of a transmission driving a shaft for driving a vehicle, means for circulating lubricant from a source of supply through the transmission, a cooler having its inlet connected to the circulating means and its outlet connected to the source of supply, a by-pass conduit from the circulating means around the cooler to the source of supply, a valve responsive to the pressure of the cooler for opening and closing the by-pass conduit, said valve including a spring urging the valve closed whereby the by-pass conduit is closed whenever the pressure in the cooler is below a predetermined value, a brake for the shaft, fluid pressure operated means for applying the brake, means responsive to application of the brake for circulating lubricant from the circulating means in thermal contact with the brake and an expansible fluid pressure chamber connected to said fluid pressure operated means for urging the valve closed to increase the predetermined pressure necessary to open the valve.

5. The combination of a transmission driving a shaft for driving a vehicle, means for circulating lubricant from a source of supply through the transmission, a cooler having its inlet connected to the circulating means and its outlet connected to the source of supply, a by-pass conduit from the circulating means around the cooler to the source of supply, a brake for the shaft, fluid pressure operated means for applying the brake, means responsive to application of the brake for circulating lubricant from the circulating means in thermal contact with the brake, a valve casing in the by-pass having a valve seat and having an inlet connected to the inlet of the cooler and an outlet connected to a inlet for the circulating means, a tubular valve member in the casing having a valve surface on one end of the tube, adapted to contact the seat to prevent flow through the casing, a passage through the tube from said valve surface to said outlet and a spring surrounding the passage urging the valve surface against the valve seat.

6. The combination of a transmission driving a shaft for driving a vehicle, means for circulating lubricant from a source of supply through the transmission, a cooler having its inlet connected to the circulating means and its outlet connected to the source of supply, a by-pass conduit from the circulating means around the cooler to the source of supply, a brake for the shaft, fluid pressure operated means for applying the brake, means responsive to application of the brake for circulating lubricant from the circulating means in thermal contact with the brake, a valve casing in the by-pass having a valve seat and having an inlet connected to the inlet of the cooler and an outlet connected to an inlet for the circulating means, a tubular valve member in the casing having a valve surface on one end of the tube adapted to contact the seat to prevent flow through the casing, a passage through the tube from said valve surface to said outlet, a spring surrounding the passage urging the valve surface against the valve seat, a shoulder in the exterior of said tube forming with the casing an expansible fluid pressure chamber and means connecting the fluid pressure operated means with the chamber.

7. The combination of a transmission driving a shaft for driving a vehicle, means for circulating lubricant from a source of supply through the transmission, a cooler having its inlet connected to the circulating means and its outlet connected to the source of supply, a by-pass conduit from the circulating means around the cooler to the source of supply, a brake for the shaft, fluid pressure operated means for applying the brake, means responsive to application of the brake for circulating lubricant from the circulating means in thermal contact with the brake, a valve casing in the by-pass having a valve seat and having an inlet connected to the inlet of the cooler and an outlet connected to an inlet for the circulating means, a tubular valve member in the casing having a valve surface on one end of the tube adapted to contact the seat to prevent flow through the casing, a passage through the tube from said valve surface to said outlet, and a spring in the tube surrounding the passage and urging the valve surface against the valve seat.

References Cited in the file of this patent

UNITED STATES PATENTS

| | | |
|---|---|---|
| 1,380,584 | Parker | June 7, 1921 |
| 1,937,565 | Griffiths | Dec. 5, 1933 |
| 2,116,992 | Weaver | May 10, 1938 |
| 2,127,557 | Ells | Aug. 23, 1938 |
| 2,140,735 | Clarke et al. | Dec. 20, 1938 |
| 2,471,858 | Bloomfield | May 31, 1949 |
| 2,504,859 | Majneri | Apr. 18, 1950 |
| 2,541,227 | Findley | Feb. 13, 1951 |
| 2,821,095 | Kelley | Jan. 28, 1958 |
| 2,833,385 | Peterson et al. | May 6, 1958 |